(12) United States Patent
Sharon (10) Patent No.: US 11,269,725 B2
(45) Date of Patent: *Mar. 8, 2022

(54) STORAGE SYSTEM AND METHOD FOR DIRECT QUAD-LEVEL CELL (QLC) PROGRAMMING

(71) Applicant: Western Digital Technologies, Inc., San Jose, CA (US)

(72) Inventor: Eran Sharon, Rishon Lezion (IL)

(73) Assignee: Western Digital Technologies, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/914,790

(22) Filed: Jun. 29, 2020

(65) Prior Publication Data

US 2021/0406122 A1 Dec. 30, 2021

(51) Int. Cl.
*G06F 11/10* (2006.01)
*G06F 11/30* (2006.01)
*G06F 3/06* (2006.01)

(52) U.S. Cl.
CPC ........ *G06F 11/1072* (2013.01); *G06F 3/0619* (2013.01); *G06F 3/0656* (2013.01); *G06F 3/0659* (2013.01); *G06F 3/0679* (2013.01); *G06F 11/1044* (2013.01); *G06F 11/3037* (2013.01)

(58) Field of Classification Search
CPC .... G06F 3/0656; G06F 3/0619; G06F 3/0679; G06F 11/1044; G06F 11/1072; G06F 3/0659
See application file for complete search history.

(56) References Cited

U.S. PATENT DOCUMENTS

| 8,861,269 | B2 | 10/2014 | Chen et al. |
| 9,070,427 | B2 | 6/2015 | Sharon et al. |
| 2017/0371565 | A1* | 12/2017 | Liu ........................ G11C 16/08 |
| 2019/0252024 | A1* | 8/2019 | Watanabe .......... G11C 16/0483 |
| 2020/0066354 | A1* | 2/2020 | Ioannou ............. G11C 16/0483 |

* cited by examiner

*Primary Examiner* — Shelly A Chase
(74) *Attorney, Agent, or Firm* — Crowell & Moring LLP (57) ABSTRACT

A storage system and method for direct quad-level cell (QLC) programming are provided. In one example, a controller of the storage system is configured to create codewords for lower, middle, and upper pages of data; program the codewords in the memory of the storage system using a triple-level cell programming operation; read the programming of the codewords for the lower, middle, and upper pages of data in the memory; create a codeword for a top page of data; and program the codeword in the memory.

20 Claims, 11 Drawing Sheets

|   | s0 | s1 | s2 | s3 | s4 | s5 | s6 | s7 | s8 | s9 | s10 | s11 | s12 | s13 | s14 | s15 |
|---|----|----|----|----|----|----|----|----|----|----|-----|-----|-----|-----|-----|-----|
| L | 1  | 1  | 0  | 0  | 0  | 0  | 0  | 0  | 0  | 0  | 1   | 1   | 1   | 1   | 1   | 1   |
| M | 1  | 1  | 1  | 1  | 0  | 0  | 0  | 0  | 1  | 1  | 1   | 1   | 0   | 0   | 0   | 0   |
| U | 1  | 1  | 1  | 1  | 1  | 1  | 0  | 0  | 0  | 0  | 0   | 0   | 0   | 0   | 1   | 1   |
| T | 1  | 0  | 0  | 1  | 1  | 0  | 0  | 1  | 1  | 0  | 0   | 1   | 1   | 0   | 0   | 1   |

STORAGE SYSTEM AND METHOD FOR DIRECT QUAD-LEVEL CELL (QLC) PROGRAMMING

BACKGROUND

When writing data to a non-volatile memory having a multi-level cell (MLC) configuration, the process is typically accomplished by storing each of the bits for a cell in random access memory (RAM) in the memory controller for all the cells in a complete wordline in the memory and then proceeding with a multiple-stage programming process for injecting charge into each multi-bit cell to achieve the programmed state desired for that cell. As part of this multiple-step programming process, and for each of the multiple programming steps, memory in the controller can store a copy of all the data bits to be programmed in a cell and process the error correction code (ECC) bits for the data.

DETAILED DESCRIPTION

By way of introduction, the below embodiments relate to a storage system and method for direct quad-level cell (QLC) programming. In one embodiment, a controller of the storage system is configured to create codewords for lower, middle, and upper pages of data; program the codewords for the lower, middle, and upper pages of data in the memory of the storage system using a triple-level cell programming operation; verify the programming of the codewords for the lower, middle, and upper pages of data in the memory; create a codeword for a top page of data; and program the codeword for the top page of data in the memory. Other embodiments are possible, and each of the embodiments can be used alone or together in combination. Accordingly, various embodiments will now be described with reference to the attached drawings.

Figures 1A, 1B:
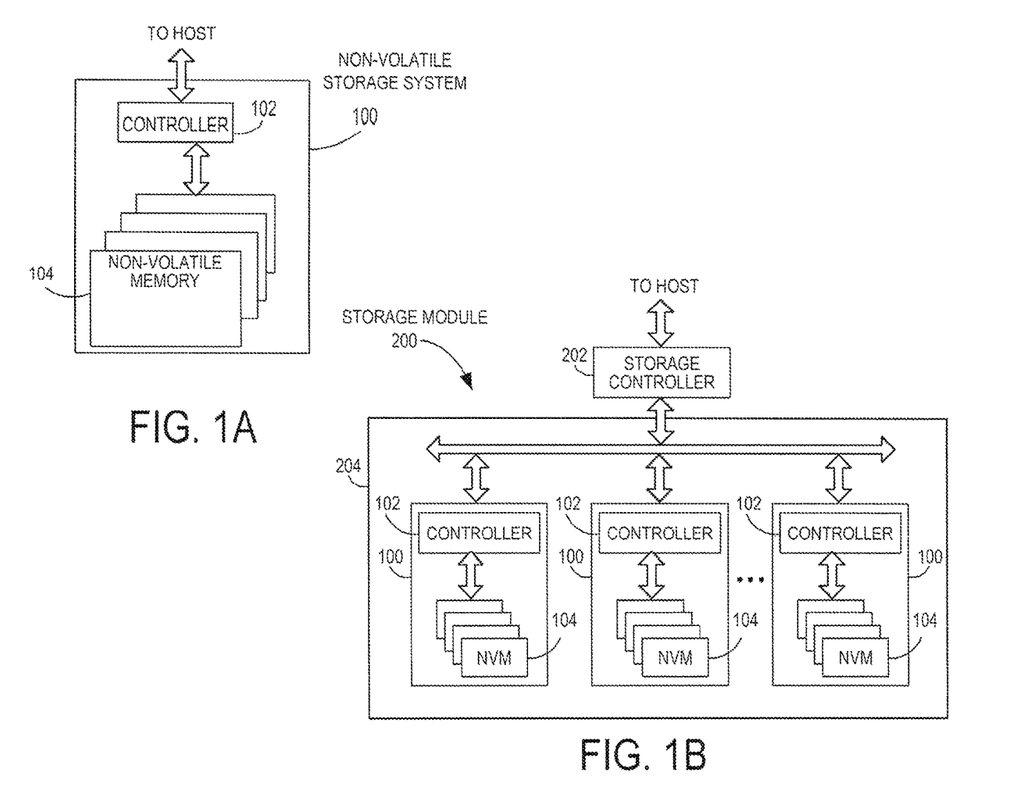
FIG. 1A is a block diagram of a non-volatile storage system of an embodiment.
FIG. 1B is a block diagram illustrating a storage module of an embodiment.
Figure 1C:
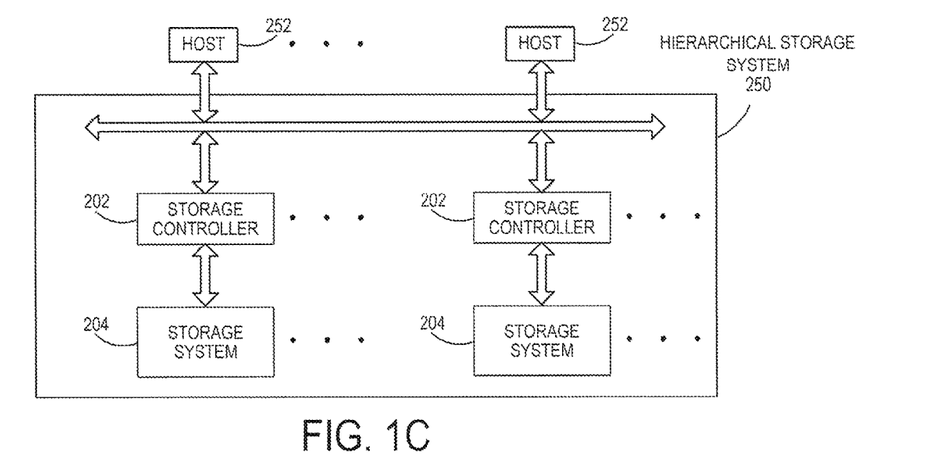
FIG. 1C is a block diagram illustrating a hierarchical storage system of an embodiment.

Turning now to the drawings, storage systems suitable for use in implementing aspects of these embodiments are shown in FIGS. 1A-1C. FIG. 1A is a block diagram illustrating a non-volatile storage system 100 (sometimes referred to herein as a storage device or just device) according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused). Also, the structure for the "means" recited in the claims can include, for example, some or all of the structures of the controller described herein, programmed or manufactured as appropriate to cause the controller to operate to perform the recited functions.

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card based system, such as a secure digital (SD) or a micro secure digital (micro-SD) card. In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some storage system architectures (such as the ones shown in FIGS. 1B and 1C), 2, 4, 8 or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be a Non-Volatile Memory Express (NVMe) or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
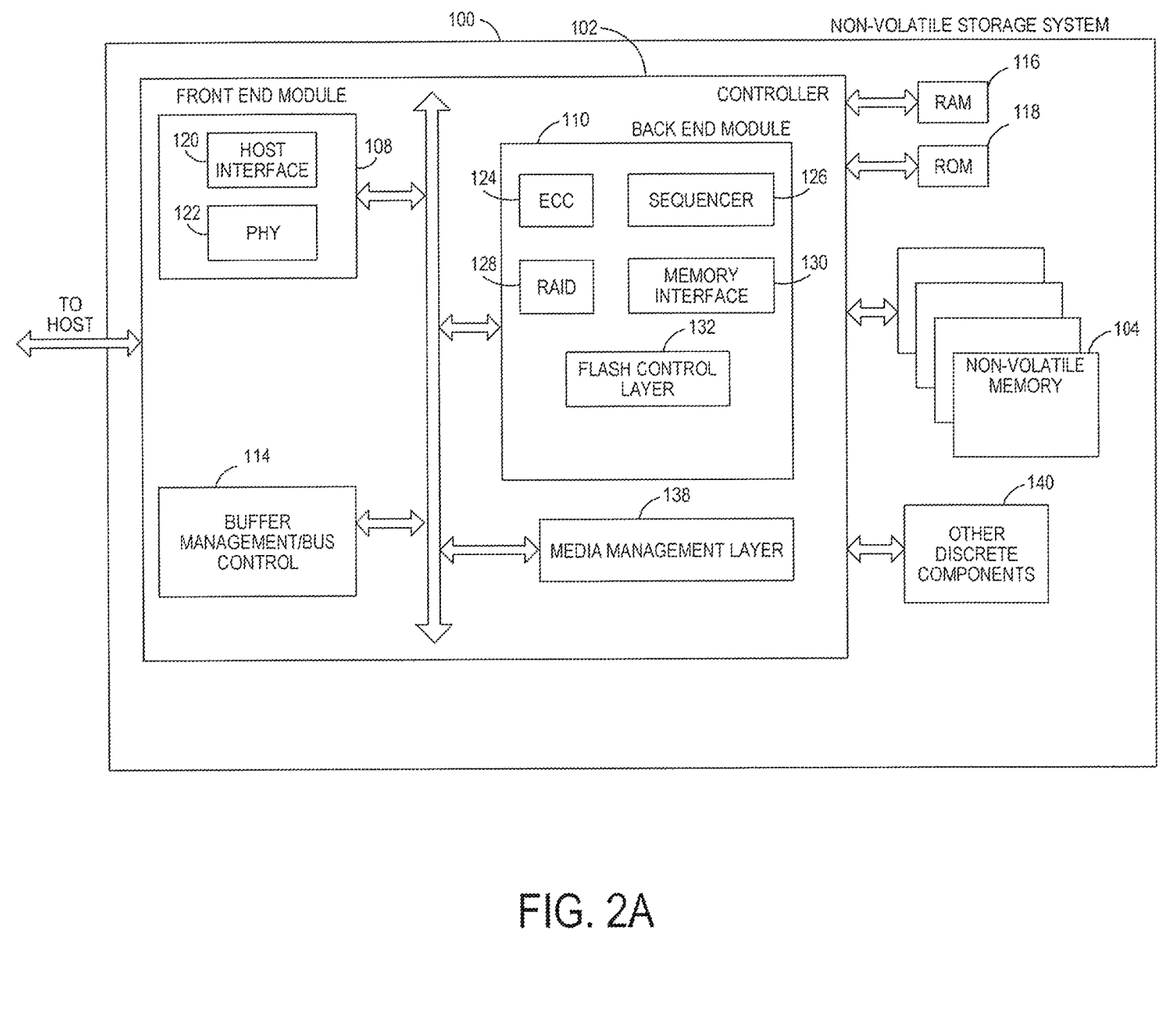
FIG. 2A is a block diagram illustrating components of the controller of the non-volatile storage system illustrated in FIG. 1A according to an embodiment.

FIG. 2A is a block diagram illustrating components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. The controller 102 may sometimes be referred to herein as a NAND controller or a flash controller, but it should be understood that the controller 102 can be used with any suitable memory technology, example of some of which are provided below.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

The storage system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
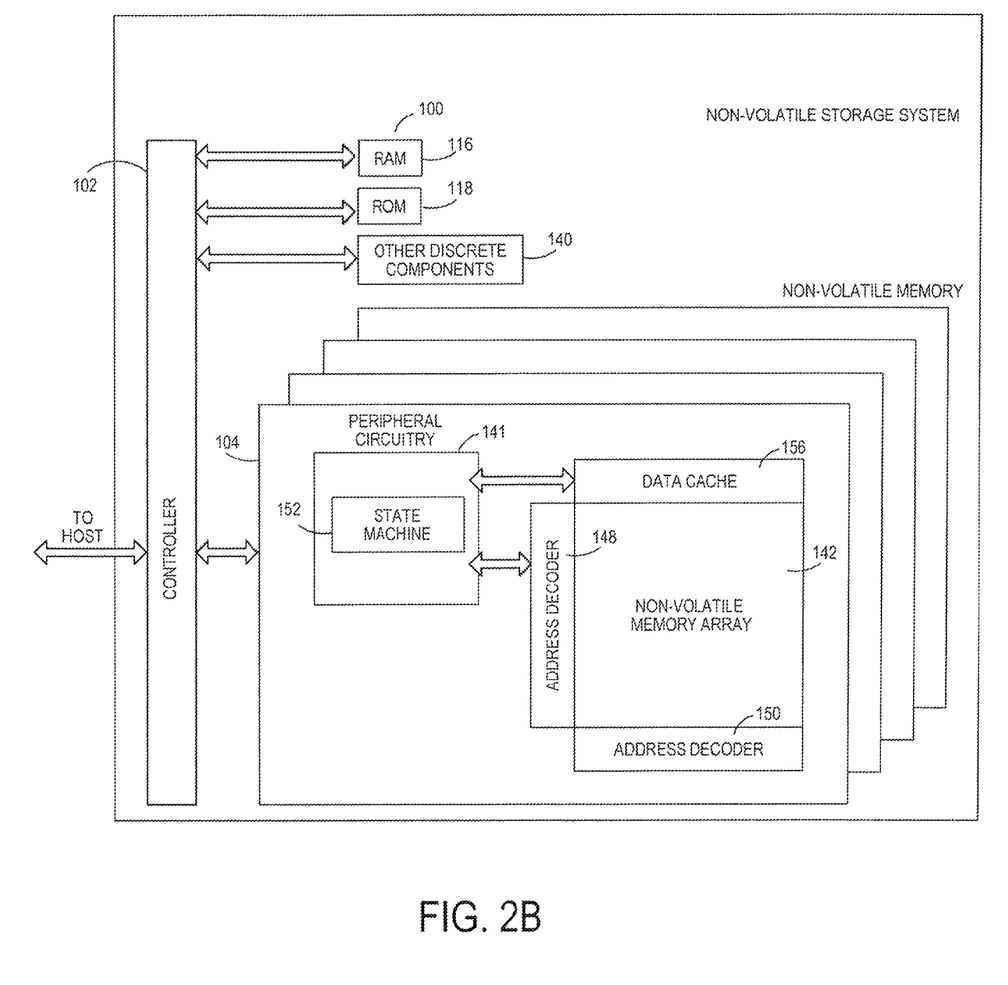
FIG. 2B is a block diagram illustrating components of the non-volatile storage system illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two dimensional and/or three dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may only be written in multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

As mentioned above, when writing data to a non-volatile memory having a multi-level cell (MLC) configuration, the process is typically accomplished by storing each of the plurality of bits for a cell in random access memory (RAM) in the memory controller for all the cells in a complete wordline in the memory and then proceeding with a multiple-stage programming process for injecting charge into each multi-bit cell to achieve the programmed state desired for that cell. Usually, the multi-stage programming involves initially programming part of the states with widened voltage distributions (i.e., the "Foggy" programming step), followed by final programming of all the states with tight voltage distribution (i.e., the "Fine" programming step). As part of this multiple-step programming process, and for each of the multiple programming steps, memory in the controller can store a copy of all the data bits to be programmed in a cell and process the error correction code (ECC) bits for the data. Foggy-Fine programming schemes are well known for programming multi-level cell memories.

In order to improve memory cost efficiency by increasing memory density, quad level cells (QLC) that store four bits per cell to provide 16 data states can be used. When designing a QLC programming scheme, there are several considerations that need to be taken into account. One consideration is supporting a smaller write buffer. Conventional Foggy-Fine programming schemes can require a large write buffer (e.g. ~1.5 MB per die), especially when the number of memory planes/strings/page size grow (as expected from one memory generation to the next), which may be excessive. A programming scheme which allows programming some of the pages (e.g. 1 or 2 or 3 pages) during a first pass, such that reliable reading of the pages is possible without applying ECC correction, prior to adding the remaining pages in a following pass can allow significant reduction in the write buffer (as the pages that are programmed in the first pass do not need to be stored in the controller write buffer for the next pass given that they can be reliably read from the memory array).

One example for such a programming scheme is MLC-Fine programming, where two pages ("MLC") are programmed in the first "Foggy" pass and the remaining two pages are added in the following "Fine" pass. The main drawback of such MLC-Fine programming is that in order to enable sufficient margin between the 4 MLC states to enable internal read within the memory array without ECC correction (i.e., IDL read), a non-balanced state coding may be required. I.e. the resulting state coding may be a Grey coding with significantly different number of I/O transitions per page. For example, a 2-3-5-5 or a 1-2-6-6 Gray coding may be required instead of a balanced (as possible) state coding, such as a 3-4-4-4 coding.

The unbalanced state coding results in unbalanced Bit Error Rate (BER) per page, which means that more ECC redundancy is required in order to achieve the same reliability (as the ECC needs to cope with the worst page). This in turn reduces the memory cost efficiency as more overhead need to be allocated for ECC. Another alternative, is to encode the data programmed during the "Foggy" step using a very simple ECC (e.g. simple XOR page), such that "Foggy" page read back may be possible inside the memory die, given that the decoding of the ECC is based on sufficiently low complexity logic. Such, an encoded Foggy-Fine programming scheme can require a relatively-small write buffer, and may enable using a balanced Grey state coding (i.e. 3-4-4-4 state coding). However, this depends on the memory quality in order to guarantee that the simple ECC applied to the Foggy data can provide sufficient reliability and incurs performance penalty for the Foggy decoding and Foggy parity transfer.

As mentioned, another important consideration is usage a state coding which is as balanced as possible. Non-balanced coding induces a non-balanced bit error rate (BER) across pages and is sensitive to jitter in the state locations. This can significantly degrade the BER distribution and eat up the voltage (Vt) margin. Also, non-balanced coding can result in a non-balanced read time (tR). A 3-4-4-4 coding scheme (wherein each number indicates the number of transitions) may be preferred in terms of BER and tR balancing. However, it does not allow for MLC-Fine programming, as there is no margin for IDL read or for the resulting Near WL Interference (NWI) to be bad. A 2-3-5-5 or 1-2-6-6 coding may allow for MLC-Fine programming but may result in poor BER and tR balancing. Yet another condition is robustness to an ungraceful shutdown (UGSD). Only a 1-2-6-6 coding seems to be robust enough for UGSD (and even that is still under question), but due to being highly non-balanced, it may not be feasible in terms of the BER balancing.

The following embodiments present a QLC programming scheme that satisfies the above conditions while avoiding the above problems. In general, these embodiments recognize that it may be desired to use a direct QLC programming scheme in order to reduce the required write buffer and avoid the need for going through single level cells (SLCs). In addition, these embodiments recognize that it may be desired to use a balance grey state coding in order to have balanced bit error rate (BER) and balanced read time (tR) across different pages, all while being robust to an ungraceful shutdown.

In general, with these embodiments, the controller 102 of the storage system 100 transfers three pages during a triple level cell (TLC) programming phase and then transfers one extra page using the Fine stage, where the first three pages are read internally (e.g., via an IDL read). So, with these embodiments, a QLC memory cell can be programmed using a two-stage approach. The first stage is a direct TLC programming stage, in which three pages are programmed in the memory. The second stage programs the QLC (one extra page) using a non-balanced mapping (e.g., 2-3-2-8). The non-balanced mapping is compensated for by using different redundancy for the triple level cell (TLC) pages than for the extra QLC page added on top. Such a two-stage programming technique can require a smaller write buffer, provide high performance, and have very low NWI. However, it may require system and ECC changes due to the different ECC redundancy per page (or different data payload per page).

The following paragraphs provide example implementations of this embodiment. It should be understood that these are merely examples, and other implementations can be used.

Figure 3:
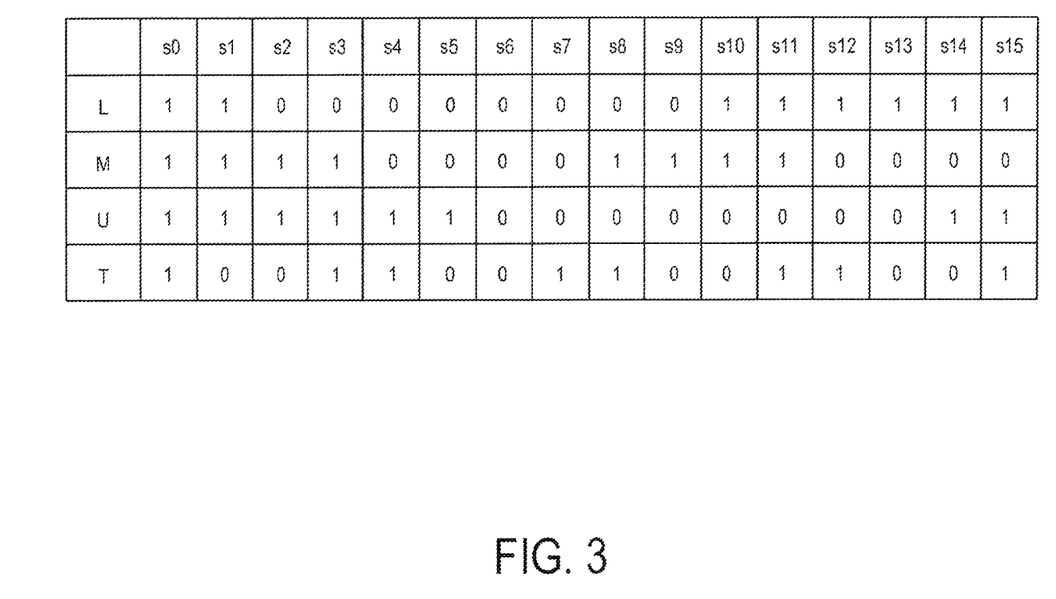
FIG. 3 is a diagram of a 2-3-2-8 grey code mapping for use with an embodiment.

Turning to the drawings, FIG. 3 is a diagram of a 2-3-2-8 grey code mapping for use with an embodiment. This stage coding diagram shows 16 states (S0 to S15) in each of the lower (L), middle (M), upper (U), and top (pages). "2-3-2-8" refers to the transitions in each page. So, the lower and upper pages have two transitions, the middle page has three transitions, and the top page has eight transitions.

Figure 4:
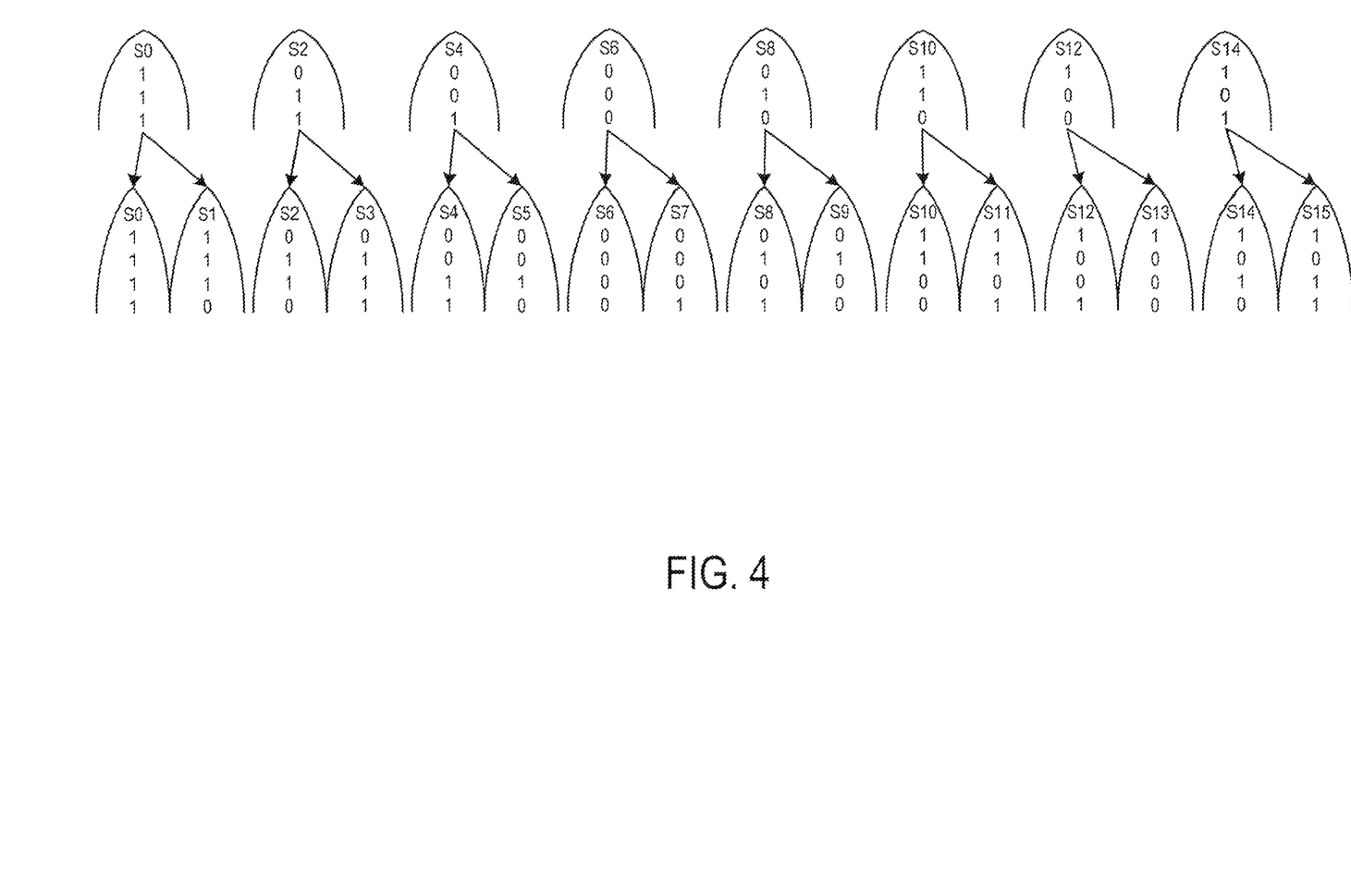
FIG. 4 is a diagram illustrating a two-stage programming technique of an embodiment.

FIG. 4 is a diagram illustrating a two-stage programming technique of an embodiment. As shown in FIG. 4, in the first programming stage, the lower, middle, and upper pages are programmed using a direct 2-3-2 triple level cell (TLC) programming technique, which has a relative small step programming voltage (dVPGM). In the second programming stage, the top page is programmed based on an internal Foggy read. With this programming scheme, the top page has a high BER due to its eight transitions, but that is compensated by its high ECC redundancy. The higher top page ECC redundancy may be enabled by storing less data on the top page (e.g. 12 KB instead of 16 KB) providing more room for its extended parity. Alternatively, the extra ECC redundancy of the top page may "spill over" to the other pages—i.e. part of the other lower/middle/upper pages (which require smaller amount of ECC redundancy) may be allocated for storing top page ECC redundancy. Foggy read errors may be further minimized by squeezing the top page state transitions, leveraging its high ECC redundancy. The implementation has a minimal write buffer requirement (direct TLC programming+Direct Top page programming). Also, these embodiments may provide power loss immunity, which may require storing one SLC page with the exclusive-or (XOR) of the lower, middle, and upper pages if an even/odd TLC state was stored.

In one example, reduced payload of 60 KBs is used per wordline: 16 KB in the lower page, 16 KB in the middle page, 16 KB in the upper page, and 12 KB in the top page. In order to compensate for the reduced amount of payload per WL (60 KB as opposed to conventional QLC payload of 4×16 KB=64 KB) and maintain the same memory density (i.e. same memory cost efficiency), a reduced WL size may be used. For example, the reduced wordline size may be: 16 KB+140 8B=17784 B, and the density is 60 KB/17784 B=3.4548 information bits per cell. This may maintain the same density as an exemplary conventional QLC memory, wherein 64 KB payload may be stored in a WL size of 18976 B, having roughly the same density of 64 KB/18976B=3.4536 information bits per cell. In this example, assuming that ECC codeword payload is 4 KB plus some metadata—e.g. 32B of FirmWare (FW) headers, the lower/upper/middle ECC redundancy per 4 KB (four codewords per page) is (17784−4×4 KB data−4×32 B FW headers)/4=318 B=7.15%, which may enable correcting BER of ~1.05%. As the top page is expected to have higher BER, given the unbalanced state coding (e.g. 2-3-2-8 coding shown on FIG. 3), more ECC redundancy need to be allocated for the top page. This is enabled by storing a smaller payload of only 12 KB on the top page. Hence, the top ECC redundancy per 4 KB (three codewords per page) is: (17784−3×4 KB data−3×32 B FW headers)/3=1800 B=30.36%, which may enable correcting BER of ~6.3%.

Figure 5:
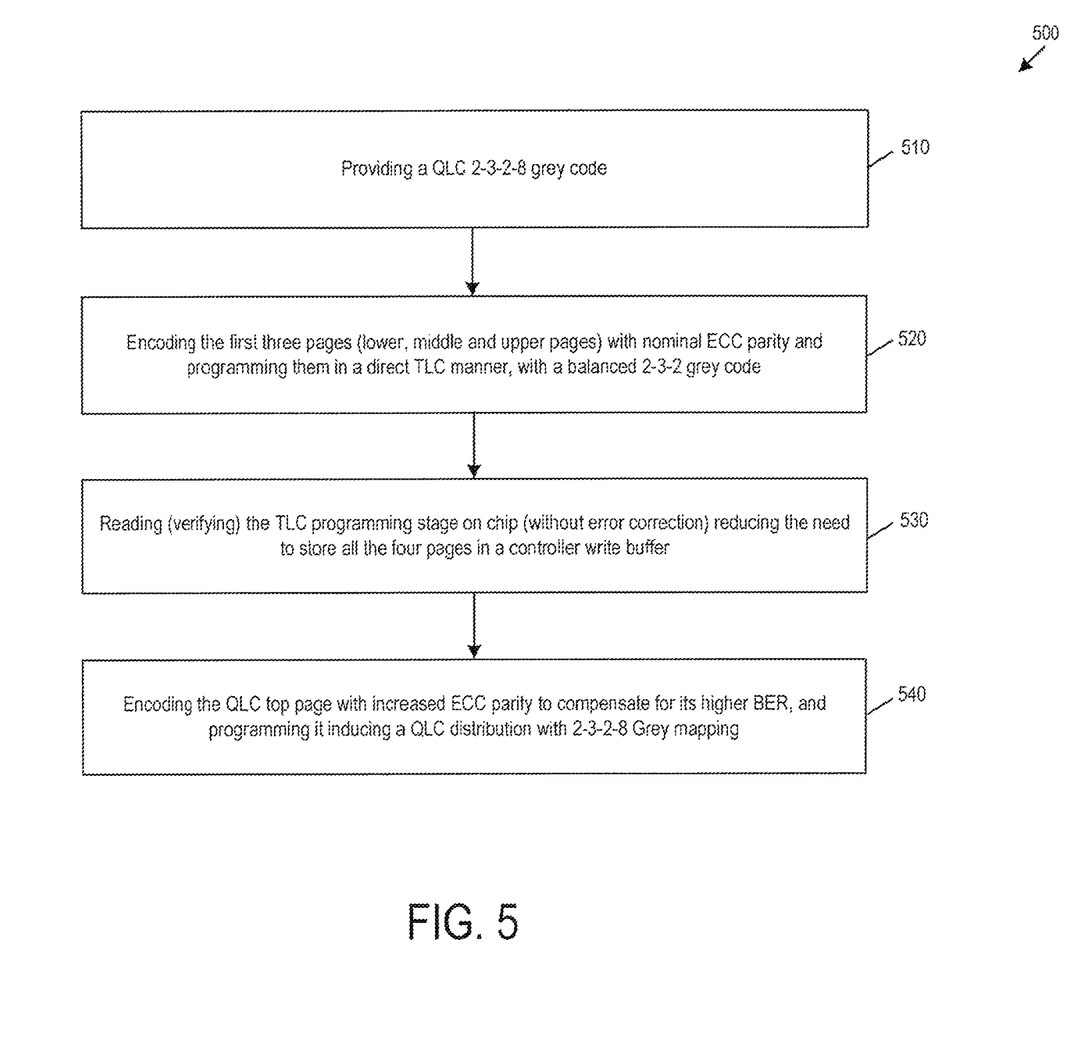
FIG. 5 is a flow chart of a method of an embodiment for direct quad-level cell (QLC) programming.

This implementation is illustrated in further detail in the flow chart 500 in FIG. 5. As shown in FIG. 5, in this embodiment, a QLC 2-3-2-2 grey code mapping is provided (act 510). Next, the controller 102 encodes the first three pages (lower, middle, and upper pages) with nominal ECC redundancy and programs them in a direct TLC manner with a balance 2-3-2 grey code (act 520). Then, the storage system 100 reads (verifies) the TLC programming stage on the memory chip 104 (without error correction), reducing the need to store all four pages in the controller's write buffer (act 530). In case that the pages in their Foggy state cannot be reliably read without ECC correction (i.e. BER is not negligible), then simple temporary coding can be applied to the Foggy pages, e.g. by storing aside a XOR page of the Lower, Middle and Upper pages in the controller write buffer and using it to perform simple decoding of the pages in their Foggy page. Alternatively, low complexity ECC decoder (such as a bit flipping LDPC decoder) can be implemented within the memory die, given that the BER of the pages in their Foggy state is expected to be very low. Such low complexity decoder can also be implemented in a CMOS wafer bonded to the memory die (aka CMOS bonded Array—CbA). Finally, the controller 102 encodes the QLC top page with increased ECC redundancy to compensate for its higher BER. The increased top page ECC redundancy may be enabled by sorting less data on the top page (smaller data payload). The top page programming induces a QLC distribution with 2-3-2-8 grey mapping (act 540).

Figure 6:
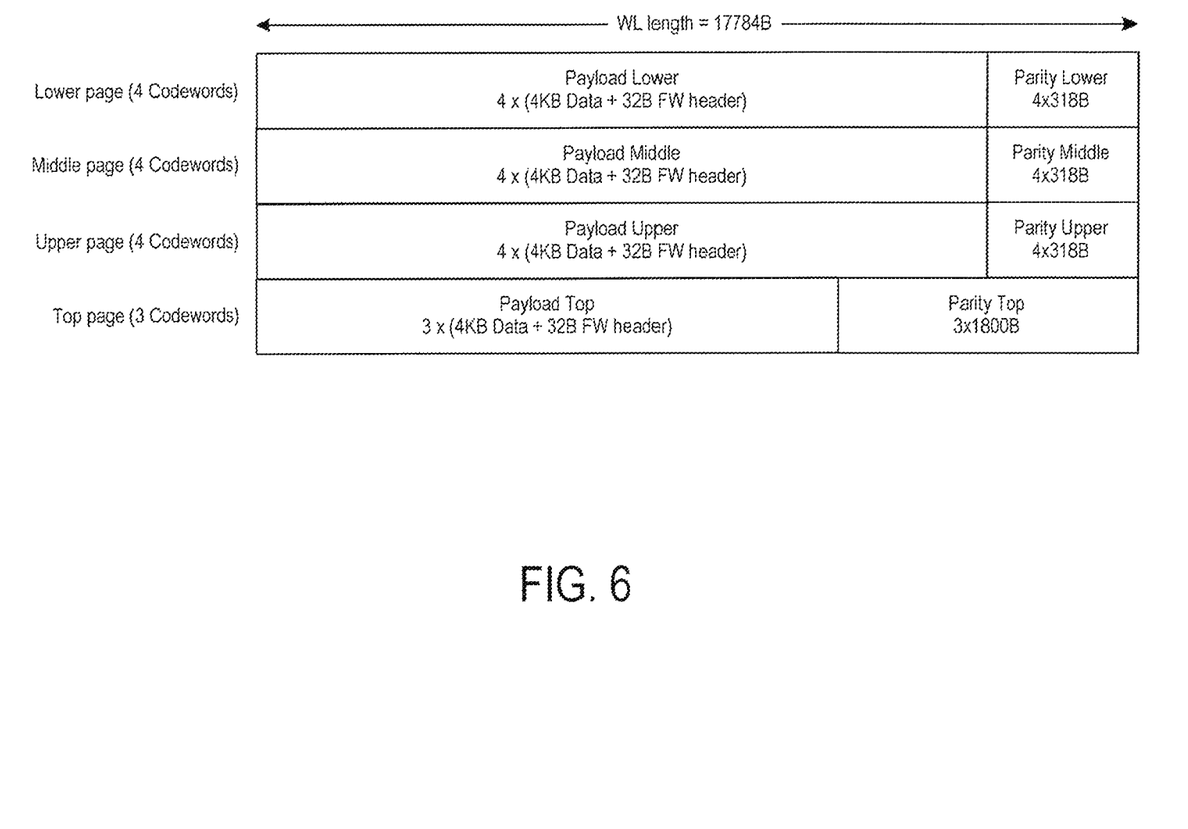
FIG. 6 is an illustration of codewords of an embodiment.

FIG. 6 is an illustration of the codewords generated by the method of this embodiment. As shown in FIG. 6, the top page has fewer codewords than the other three pages, and the extra space in the wordline is used for extra parity bits.

There are many alternatives that can be used with these embodiments. For example, in case the balancing between the top page and the lower, middle, and upper pages turn out to be suboptimal (e.g., too much ECC was spent on the top page and insufficient ECC was spent on lower, middle, and upper pages), some of the top page may be allocated for extra lower, middle, and upper page parity. For example, out of the 17784−3×4 KB−3×32 B=5400 B of parity available on the top page, we may allocate: 4128 B for the three codewords of the top page. This results in 1376 B ECC/4 KB=25% ECC redundancy, which results in correction capability of ~5%. 1272 B as extra parity for the lower, middle, and upper pages generate extra 4×318B parity bits per page. The extra parity bits of the lower, middle, and upper pages can be XOR'ed, and the result can be stored in the top page. In case a single page (lower, middle, or upper) is failing, we can recover an extra 318 B of ECC per codeword, resulting in doubling the redundancy to ~14.3%. This provides a correction capability of ~2.5%

This embodiment may be more complicated than the other embodiment described above because if may need an extra write buffer to store 1272 B per Foggy programming until Fine programming is complete. For example, an extra 1272B×4P×6 Strings is ~30 KB. Also, lower, middle, and upper uncorrectable error events may require a more complex recovery flow that reads the extra parity from the top page, and ECC design changes may be needed.

Figure 7:
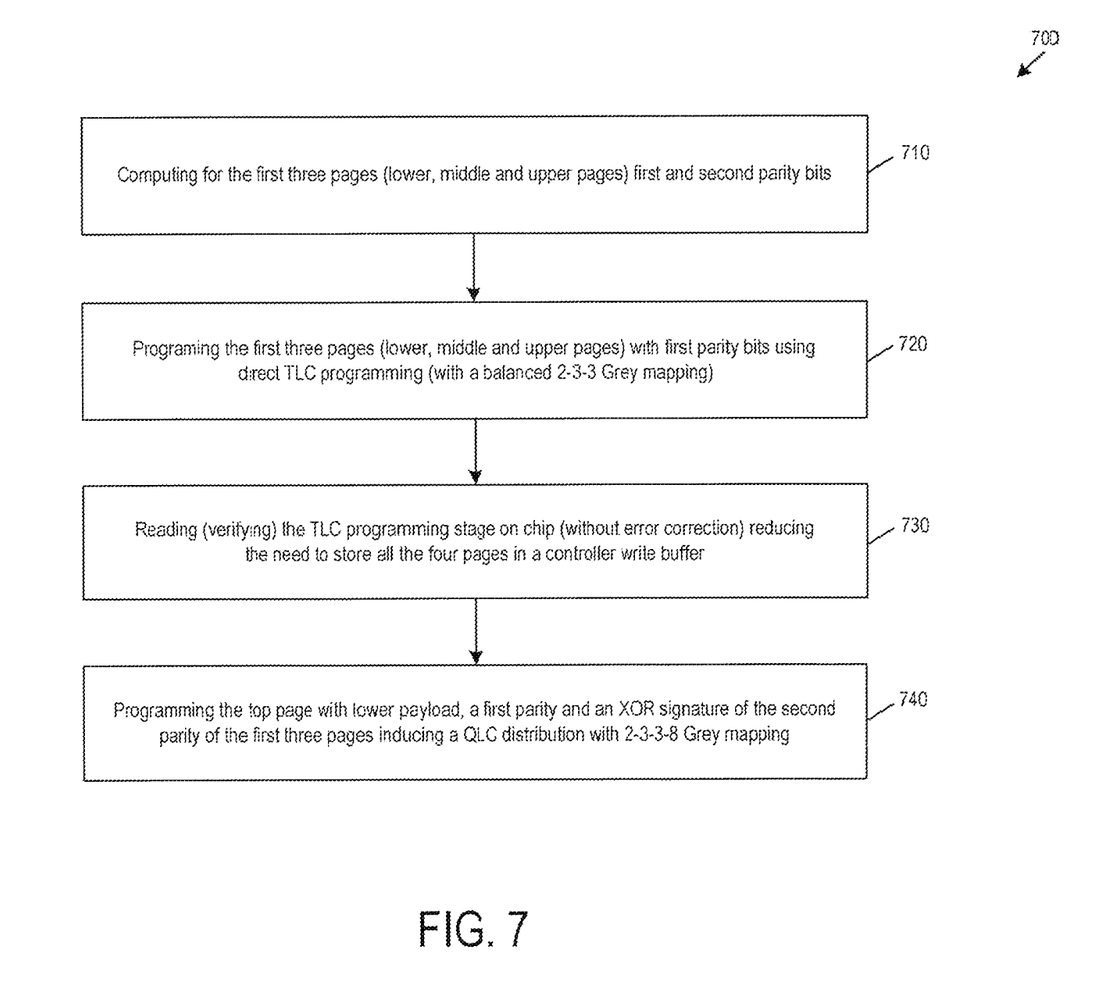
FIG. 7 is a flow chart of a method of another embodiment for direct quad-level cell (QLC) programming.
Figure 8:
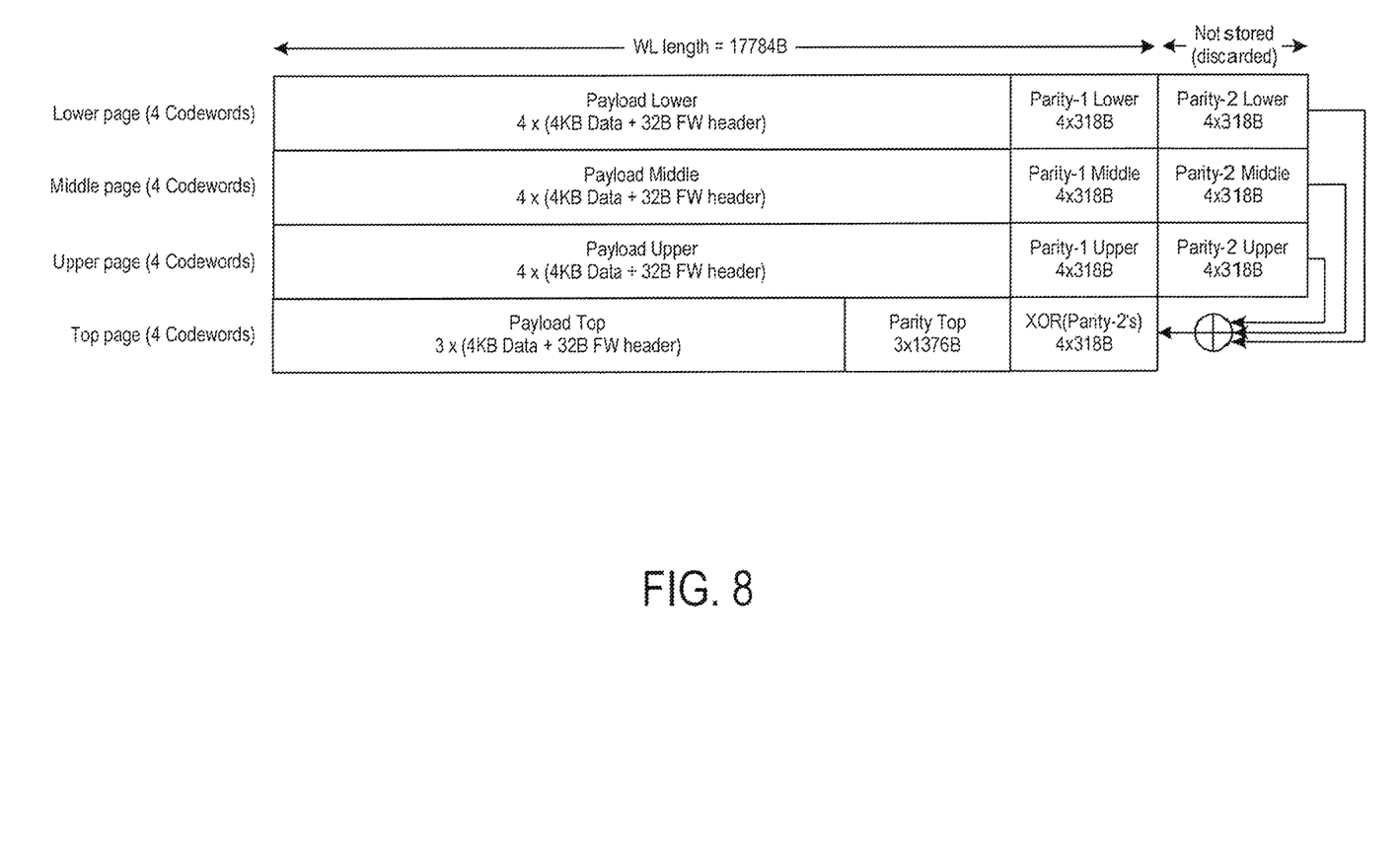
FIG. 8 is an illustration of codewords of another embodiment.

Returning to the drawings, FIG. 7 is a flow chart 700 of a method of this embodiment. As shown in FIG. 7, in this embodiment, the controller 102 computes for the first three pages (lower, middle, and upper) first and second parity bits (act 710). The controller 102 then programs the first three pages with the first parity bits using a direct triple-level cell (TLC) programming technique with a balance 2-3-2 grey code mapping (act 720). Next, the TLC programming stage is verified on the memory chip 104 without using error correction and without storing the data in the controller's write buffer (act 730). Then, the top page is programmed with the lower payload, the first parity, and an XOR signature of the second parity of the first three pages, which induces a QLC distribution with a 2-3-3-8 grey code mapping (act 740). FIG. 8 is an illustration of the codewords generated by the method of this embodiment.

In yet another alternative embodiment, there are 64 KB per wordline, with 16 KB for the lower page, 16 KB for the middle page, 16 KB for the upper page, and 16 KB for the top page. Assuming for example a QLC wordline of size 18976 B. This provides a density of 64 KB/18976 B=3.4536 information bits per cell (roughly same as the previous example). ECC redundancy can be allocated as a function of the number of transitions per page. The lower/upper pages have two transitions per page. So, the ECC redundancy is 432 B=9.5%, which provides a correction capability of ~1.55%. The middle page has three transitions per page, and the ECC redundancy there is 448 B=~9.8%, which provide a correction capability of ~1.6%. The top page has eight transitions per page. The ECC redundancy there is 1152 B=~21.8%, divided into two levels: parity-1 of 616 B and parity-2 of 536 B. The correction capability using parity-1 is ~4.3%. The correction capability using full parity (parity-1+parity-2) is ~2.2%

Figure 9:
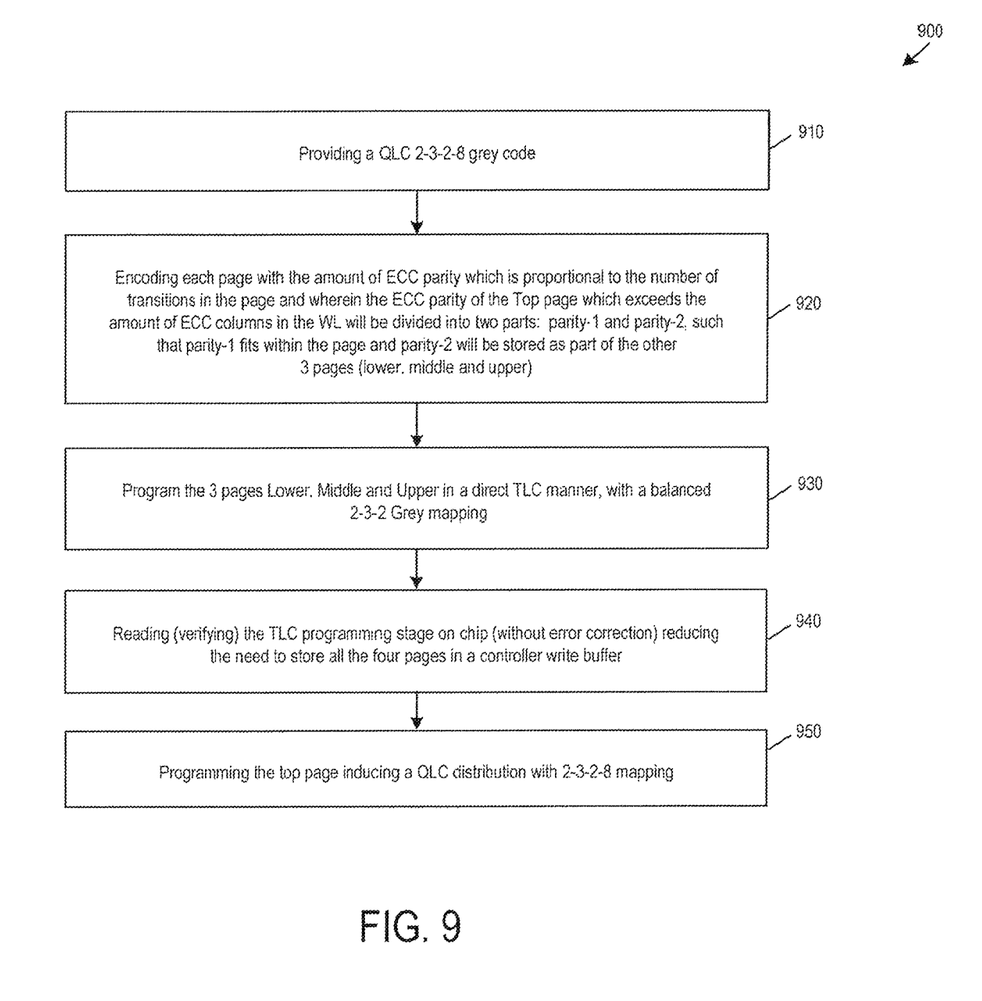
FIG. 9 is a flow chart of a method of yet another embodiment for direct quad-level cell (QLC) programming.
Figure 10:
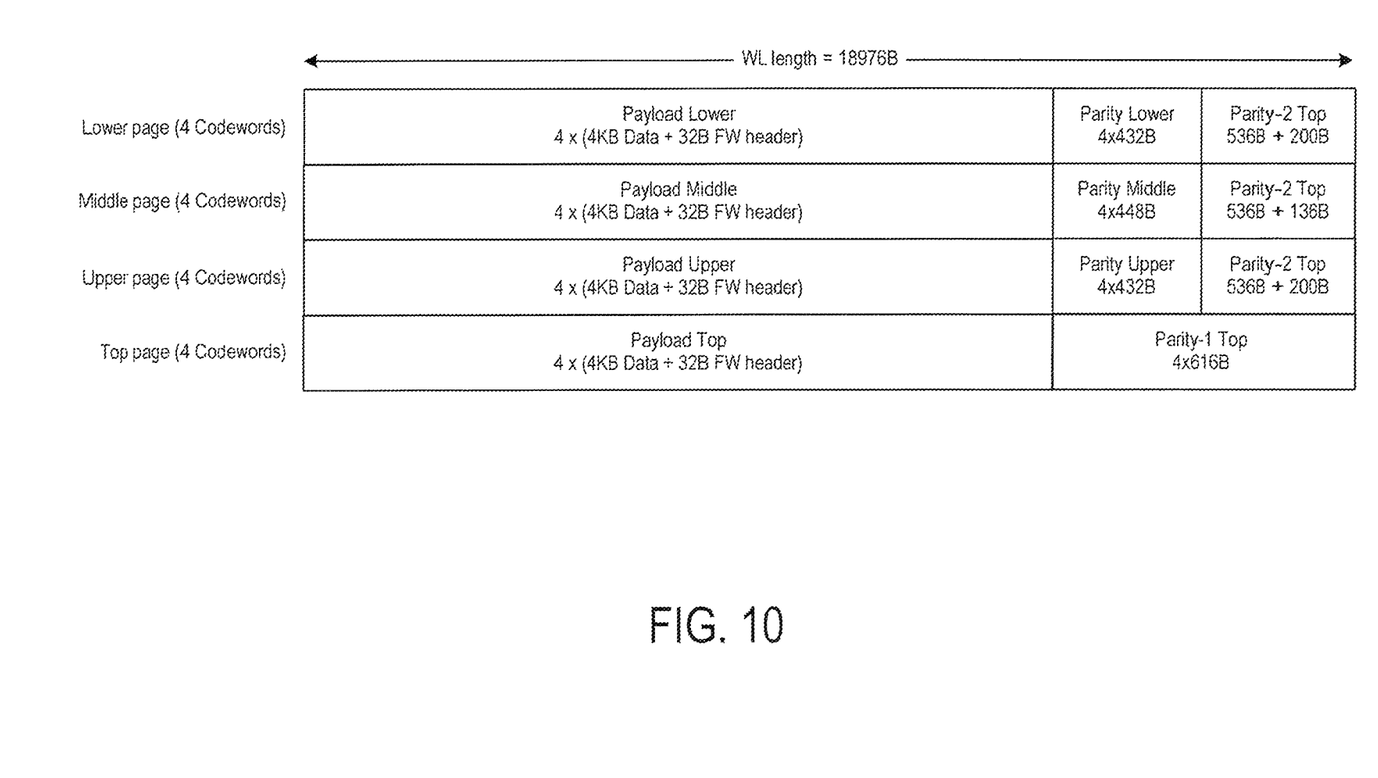
FIG. 10 is an illustration of codewords of yet another embodiment.

Returning to the drawings, FIG. 9 is a flow chart 900 of a method this embodiment. As shown in FIG. 9, in this embodiment, a QLC 2-3-2-8 grey code is provided (act 910). The controller 102 then encodes each page with an amount of ECC parity that is proportional to the number of transitions in the page (act 920). In this embodiment, the ECC parity of the top page that exceeds the amount of ECC columns in the wordline is divided into two parts: parity-1 and parity-2, such that parity-1 fits within the page and parity-2 will be stored as part of the other three pages (lower, middle, and upper). Next, the controller 102 programs the three pages (lower, middle, and upper) in a direct TLC manner with a balanced 2-3-2 grey mapping (act 930). The TLC programing stage is then verified on the memory chip 104 without error correction and without storing all the pages in the controller's memory buffer (act 940). The controller 102 then programs the top page, inducing a QLC distribution with a 2-3-2-8 mapping (act 950). FIG. 10 is an illustration of the codewords generated by the method of this embodiment. As for the previous example, in case that the pages in their Foggy state cannot be reliably read without ECC correction (i.e. BER is not negligible), then simple temporary coding can be applied to the Foggy pages, e.g. by storing aside a XOR page of the Lower, Middle and Upper pages in the controller write buffer and using it to perform simple decoding of the pages in their Foggy page. Alternatively, low complexity ECC decoder (such as a bit flipping LDPC decoder) can be implemented within the memory die, given that the BER of the pages in their Foggy state is expected to be very low. Such low complexity decoder can also be implemented in a CMOS wafer bonded to the memory die (aka CMOS bonded Array—CbA).

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A storage system comprising:
    a memory; and
    a controller configured to:
        create codewords for lower, middle, and upper pages of data;
        program the codewords for the lower, middle, and upper pages of data in the memory using a triple-level cell programming operation;
        read the programming of the codewords for the lower, middle, and upper pages of data in the memory;
        create a codeword for a top page of data; and
        program the codeword for the top page of data in the memory using the read lower, middle, and upper pages of data.

2. The storage system of claim 1, wherein the codewords for the lower, middle, and upper pages of data are programmed with a balanced 2-3-2 grey code mapping.

3. The storage system of claim 2, wherein programing the codeword for the top page of data in the memory induces a quad-level cell (QLC) distribution with 2-3-2-8 grey code mapping.

4. The storage system of claim 1, wherein the read data is retrieved without using error correction.

5. The storage system of claim 1, wherein the lower, middle and upper pages are read from the memory array without retrieving them from a write buffer in the controller.

6. The storage system of claim 1, wherein the codewords are created by encoding the lower, middle; and upper pages of data with error correction code parity bits.

7. The storage system of claim 6, wherein the codeword for the top page of data is created by encoding the top page of data with more error correction code parity bits than the lower, middle, and upper pages of data.

8. The storage system of claim 1, wherein foggy data is retrieved using a low complexity ECC decoder on the memory die or on a CMOS die bonded to the memory die (CbA).

9. In a storage system comprising a memory and a controller, a method comprising:
    computing first and second parity bits for lower, middle, and upper pages of data;
    programming the lower, middle, and upper pages of data with the first parity bits using a triple-level cell programming operation;
    reading the programming of the lower, middle, and upper pages of data in the memory; and
    programing a top page of data in the memory using the read lower, middle, and upper pages of data.

10. The method of claim 9, wherein the lower, middle, and upper pages of data are programmed with a balanced 2-3-2 grey code mapping.

11. The method of claim 10, wherein programing the top page of data in the memory induces a quad-level cell (QLC) distribution with 2-3-2-8 grey code mapping.

12. The method of claim 9, wherein the top page of data is programmed with the first parity bits and an exclusive-OR signature of the second parity bits.

13. The method of claim 9, wherein the lower, middle and upper pages are read from the memory array without retrieving them from a write buffer in the controller.

14. The method of claim 1, wherein the top page comprises a smaller payload than the lower, middle, and upper pages.

15. A storage system comprising:
   a memory;
   means for encoding each of lower, middle, upper, and top pages of data with an amount of error correction code parity bits that is proportional to a number of transition in each page;
   means for programming the lower, middle, and upper pages of data in the memory using a triple-level cell programming operation;
   means for reading the programming of the lower, middle, and upper pages of data in the memory; and
   means for programing the top page of data in the memory using the read lower, middle, and upper pages of data.

16. The storage system of claim 15, wherein the lower, middle, and upper pages of data are programmed with a balanced 2-3-2 grey code mapping.

17. The storage system of claim 16, wherein programing the top page of data in the memory induces a quad-level cell (QLC) distribution with 2-3-2-8 grey code mapping.

18. The storage system of claim 15, wherein a number of error correction code parity bits in the top page that exceed a number of error correction code columns in a wordline are divided into a first part and a second part, wherein the first part fits within the top page, and wherein the second part is stored as part of the lower, middle, and upper pages.

19. The storage system of claim 15, further comprising means for storing the same data on the top page, but having its ECC redundancy spill over to the other pages.

20. The storage system of claim 15, wherein the lower, middle and upper pages are read from the memory array without retrieving them from a write buffer in a controller of the storage system.

* * * * *